(12) United States Patent
Gezarzick et al.

(10) Patent No.: US 6,399,928 B1
(45) Date of Patent: Jun. 4, 2002

(54) DEVICE FOR HARDENING CYLINDRICAL BEARING POINTS OF A SHAFT

(75) Inventors: Waldemar Gezarzick, Remscheid; Ludwin Hackenberger, Odenthal; Hans-Jürgen Leisner, Remscheid, all of (DE)

(73) Assignee: Elotherm GmbH, Remscheid (DE)

( * ) Notice: Subject to any disclaimer, the term of this patent is extended or adjusted under 35 U.S.C. 154(b) by 0 days.

(21) Appl. No.: 09/622,806

(22) PCT Filed: Mar. 2, 1999

(86) PCT No.: PCT/EP99/01348

§ 371 (c)(1),
(2), (4) Date: Oct. 20, 2000

(87) PCT Pub. No.: WO99/45157

PCT Pub. Date: Sep. 10, 1999

(30) Foreign Application Priority Data

Mar. 2, 1998 (DE) ............................. 198 08 763

(51) Int. Cl.[7] .............................. H05B 6/14; H05B 6/44
(52) U.S. Cl. ..................... 219/639; 219/640; 219/673; 148/572; 260/129
(58) Field of Search ............................. 219/635, 639, 219/640, 647, 652, 672, 673, 676; 266/129; 148/572, 573, 567

(56) References Cited

U.S. PATENT DOCUMENTS 5,157,231 A  10/1992  Hans et al. ............... 219/639
6,140,625 A * 10/2000  Gezarzick et al. ......... 219/639
6,160,248 A * 12/2000  Ottenwaelder et al. ..... 219/639

FOREIGN PATENT DOCUMENTS

| DE | 14 83 016 A | 2/1969 |
| DE | 36 23 119 C | 5/1987 |
| DE | 42 28 093 C1 | 4/1993 |
| DE | 195 30 430 C | 4/1996 |
| EP | 1 071 490 A | 6/1967 |
| EP | 0 374 373 A | 6/1990 |
| JP | 03 188221 A | 11/1991 |

* cited by examiner

*Primary Examiner*—Philip H. Leung
(74) *Attorney, Agent, or Firm*—Proskauer Rose LLP

(57) ABSTRACT

An apparatus for hardening cylindrical bearing faces (L) of a shaft (K), wherein at least one of the transitional radii (R1, R2) to the adjoining shaft portions (W1, W2) is constructed recessed, includes a pair of inductive heating units (1, 2), which are each formed at least by one inductor (3, 4) having two spaced-out heating conductor branches (20, 22; 21, 23); an adjusting device (11, 12) for adjusting the inductors (3, 4) simultaneously from the radial direction (R) on to the bearing face (L) to be hardened and a second adjusting device (13, 14) for moving at least the inductor (3, 4) associated with the recessed radius R1, R2) after application to the bearing face (L) by a movement directed axis-parallel with the longitudinal axis (X) of the shaft (K) in the direction of the recessed transitional radius (R1, R2) until its outer heating conductor branch (20) has moved into the particular transitional radius (R1, R2).

12 Claims, 3 Drawing Sheets

DEVICE FOR HARDENING CYLINDRICAL BEARING POINTS OF A SHAFT

Figure 2:
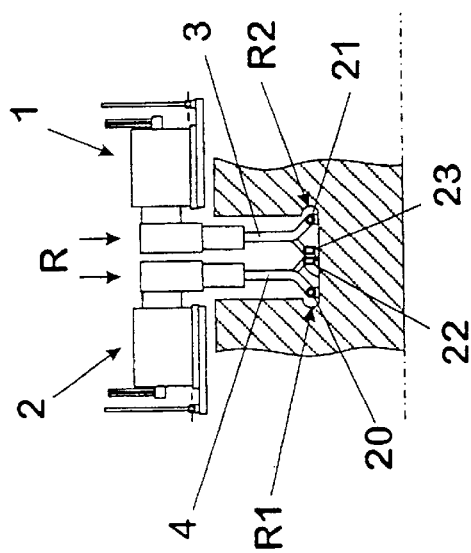

The invention relates to an apparatus for the hardening of cylindrical bearing faces of a shaft, wherein at least one of the transitional radii to the adjoining shaft portions is constructed recessed. Such apparatuses are used, for example, to harden crankshaft crankpins which are bounded laterally by cheeks. In this respect special steps are required to ensure that even the recessed transitional radii are heated to an extent adequate for proper hardening.

To this end in a prior art inductively operating apparatus of the kind specified, known from German Auslegeschrift DE-AS 14 83 016, the heating conductors of an inductor take the form of a parallelogram whose two parallel sides are at a different distance from one another. As a result, the inductor can first be moved with its narrow side into the space left between the shaft portions, until it is located on the bearing face to be hardened. By the rotation of the inductor, the heating conductors are then brought via their wide side to bear against the transitional radii. The inductor is forced resiliently against insulated members of the installation.

The advantage of the apparatus known from DE-AS 14 83 016 is that the inductors can be automatically applied to the bearing face to be hardened and moved into their operating position. At the same time the heating loops are so shaped that coolant can flow in circuit through them without problems. In this way the overheating of the loop material can be reliably prevented. However, one disadvantage of this prior art is the need for expensive apparatus to introduce and rotate the inductor. It has moreover been found in practice that with this prior art apparatus it is difficult to maintain a constant distance between workpiece and inductor, resulting in a deterioration in the processing result. A further important disadvantage of the prior art apparatus is that each inductor engages around the bearing face to be hardened by less than 90°. This causes the problem that heating energy can be introduced into the bearing face only to a limited extent. It has been found that frequently this quantity of energy is inadequate to ensure a proper hardening result.

To obviate the afore-explained problems, German Patent Specification DE 3 36 23 119 C1 suggested the use of an inductor divided into two halves for the inductive heating of the bearing face to be hardened. One of the inductor halves is rigidly connected to an adjusting unit, while the second inductor half is attached pivotably to the fixed unit. The adjusting unit comprises a device for applying the inductors to the bearing face to be hardened, a second adjusting device for moving the inductor axis-parallel with the longitudinal axis of the shaft, and a third adjusting device for pivoting the pivotable inductor half into its operating position. By means of the adjusting unit, the halves of the inductor can then be applied in a position bearing close against one another to the bearing face to be hardened, until the inductors are disposed thereon. Then first the fixed inductor half is moved into its working position, by being moved jointly with the pivotable inductor half axis-parallel with the longitudinal axis of the shaft. Then the pivotable inductor half is pivoted in the direction of its associated transitional radius.

Although with the apparatus known from DE 36 23 119 C1 it is simpler than in the earlier prior art to apply the inductor to the bearing face to be hardened and to move its inductor halves into the operating position, but the apparatus required for this purpose is still very expensive. It is also difficult to move the pivotable inductor half into an optimum operating position. This, and also the circumstance that in the prior art apparatus the heating conductors sweep over the bearing place to be hardened only with a gap in the central zone results in an inferior operating result. Lastly, both the electric connection and also the coolant supply of the pivotable inductor half are unreliable.

The problem of the invention, starting from the afore-explained prior art, is to provide an apparatus of the kind specified with which an improved operating result is achieved using less expensive apparatus.

This problem is solved according to the invention by an apparatus for the hardening of cylindrical bearing faces of a shaft, wherein at least one of the transitional radii to the adjoining shaft portions is constructed recessed, having: a pair of inductively operating heating units, which are each formed at least by one inductor having two spaced-out heating conductor branches each extending in the peripheral direction of the bearing face and which are connected to a power supply, one outer heating conductor branch of the inductor of one heating unit being associated with the first transitional radius, and an outer heating conductor branch of the inductor of the other heating unit being associated with the second transitional radius, while in each case the inner heating conductor branches of the inductors are disposed adjacent one another; an adjusting device for the purpose of adjusting the inductors simultaneously from the radial direction on to the bearing face to be hardened, until the inductors are applied to the bearing face, the heating conductor branches engaging at least partially around the bearing face in this state, and the inner heating conductor branches of the two inductors, viewed in the peripheral direction, registering contactlessly with one another in an overlap zone, and a second adjusting device for the purpose of moving at least the inductor associated with the recessed radius after application to the bearing face by a movement directed axis-parallel with the longitudinal axis of the shaft in the direction of the recessed transitional radius, until its outer heating conductor branch has moved into the particular transitional radius. Preferably each heating unit has at least one power supply.

The apparatus according to the invention is equipped with two independent heating units, each of which comprises an inductor and at least the associated power supply device. This obviates the need for unreliable connections of the electric supply of the inductors, the heating unit associated with each of them and the coolant supply. Any quenching sprays possibly additionally borne by the heating units can be supplied with quenching fluid without problems.

In the apparatus according to the invention the dimensions and external shape of the inductors of the two heating units are so adapted to one another that, in dependence on the application, either one inductor or both inductors jointly and simultaneously can be applied in a closely adjacent position to the shaft. In this position, the total width of the two inductors, measured in the axial direction of the shaft, is smaller than the width of the free space left between the shaft portions adjoining the bearing face to be hardened, so that there is no risk of any collision during the introduction of the inductors into the free space.

Due to the independence of the heating units, conventional simple adjusting devices can bring the inductors on to the bearing face with great accuracy. Similarly conventional precisely operating adjusting devices can be used to move the inductors into their final working position, in a movement directed axis-parallel with the longitudinal axis of the shaft. In this position the outer heating conductor branches of the inductors are disposed in the transitional radii associated therewith.

Due to the independence of the heating units moreover the simplest steps, for example the use of sliding pieces, can ensure without problems that the inductors maintain their working position during processing. Even in this way the result of processing in the zone of the transitional radii is improved as against conventional apparatuses of the kind by an apparatus constructed according to the invention.

The fact that the inner heating conductor branches of both inductors disposed one beside the other are also designed in such a way that they overlap one another contact-free, viewed in the peripheral direction, ensures that at the same time as the zone of the transitional radii, the entire surface of the bearing face to be hardened is heated to an extent adequate for the particularly hardening required.

Preferably measured in the axial direction of the shaft the width of the overlap zone is greater than the sum of the depths of the transitional radii. This ensures that the inner heating conductor branches of the two inductors also overlap one another in the operating position. One feature of the invention making this possible is characterised in that the heating conductor branches disposed adjacent one another are disposed at an angle, referred to the heating conductor branches associated with the transitional radii.

A particularly preferred embodiment of the invention is characterised in that the inductors engage around the bearing face to be hardened by more than 90°, preferably by more than 140°.

In dependence on the amount of heat to be introduced into the bearing face, conveniently the adjacent inner heating conductor branches are shorter than the outer heating conductor branches each associated with the transitional radii.

A preferred feature of the invention of practical relevance is characterised in that the heating conductor branches are each divided into two component parts. In this way, for example, sliding pieces can be positioned problem-free at those places at which they are required for the optimum guiding of the inductors during processing.

Another advantageous feature of the invention is characterised in that the purpose of the adjusting device operative in the radial direction is to move the heating units including the conductors as one whole. It can also be advantageous if the purpose of the adjusting device operative in the axial direction is to move the heating units including the inductors, as one whole. In this way an enhancement of operating safety can be accompanied by a further reduction of expenditure for the connections between the inductors and the power and coolant supply devices respectively.

The apparatus according to the invention is particularly suitable for the hardening of crankshaft crankpins laterally bounded by cheeks, wherein the transitional radii are recessed into the cheeks and wherein, due to the generally large height of the cheeks, the free space available for the introduction of the inductors is particularly limited.

Figure 3:
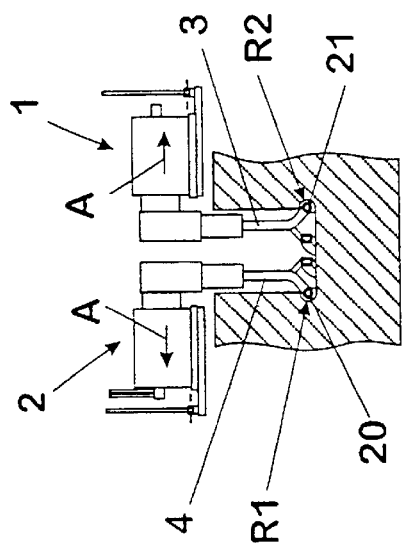
Figure 1:
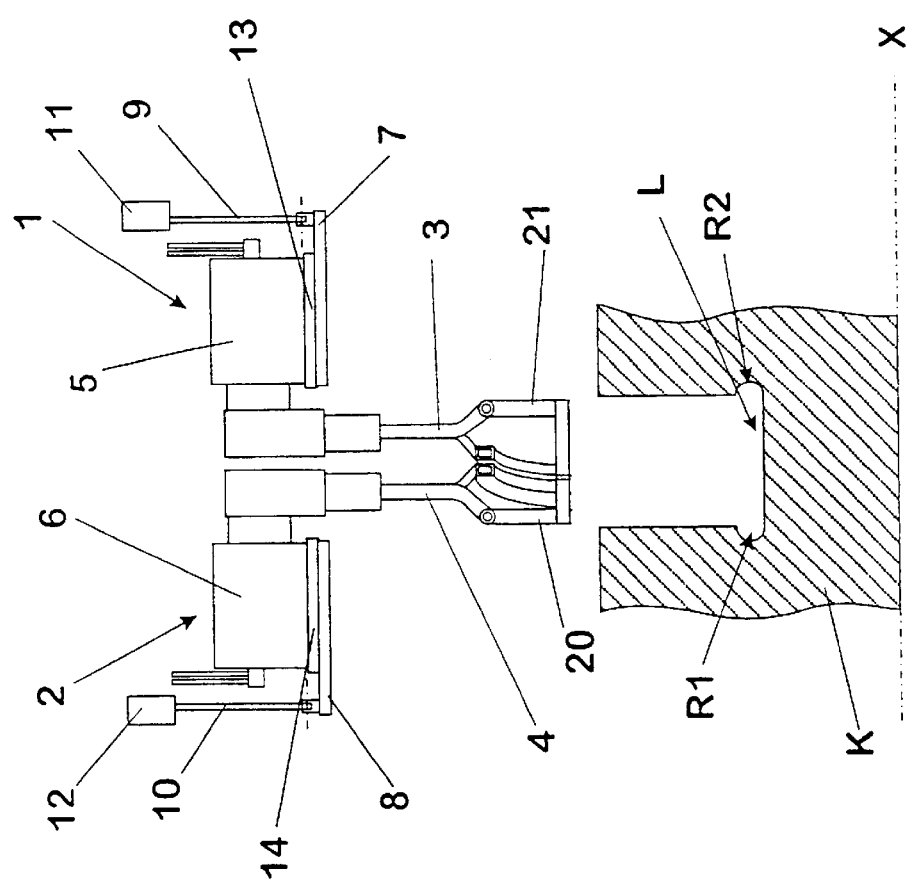
Figure 4:
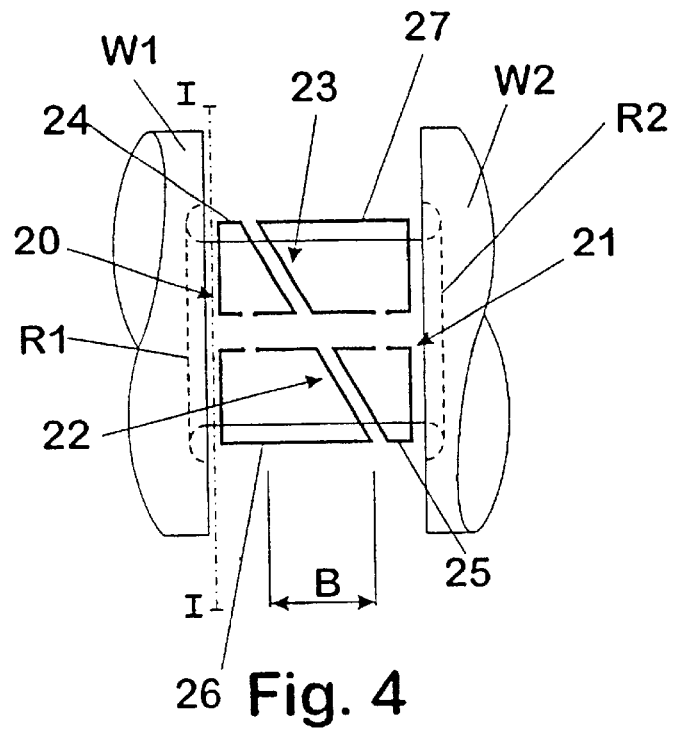
Figure 5:
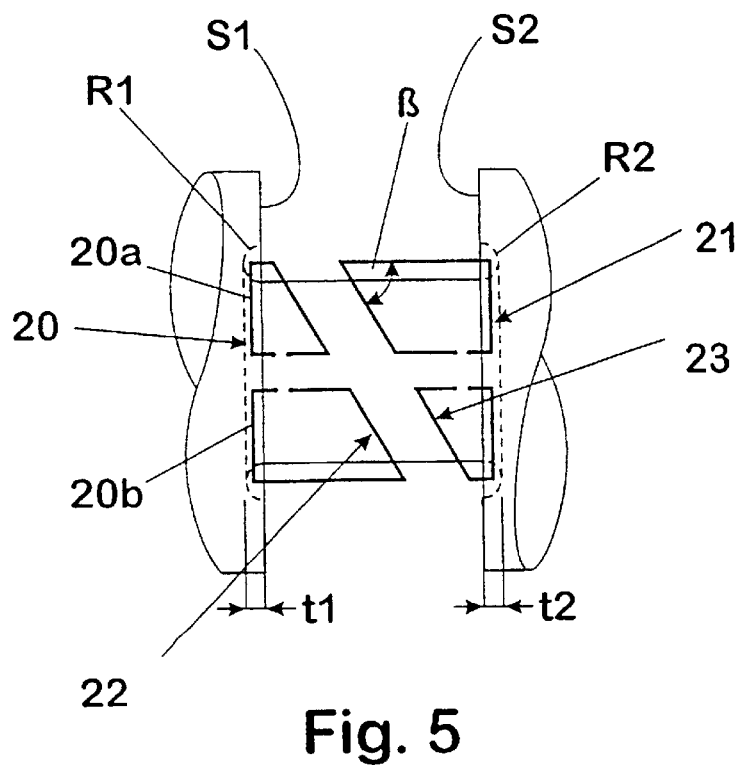
Figure 6:
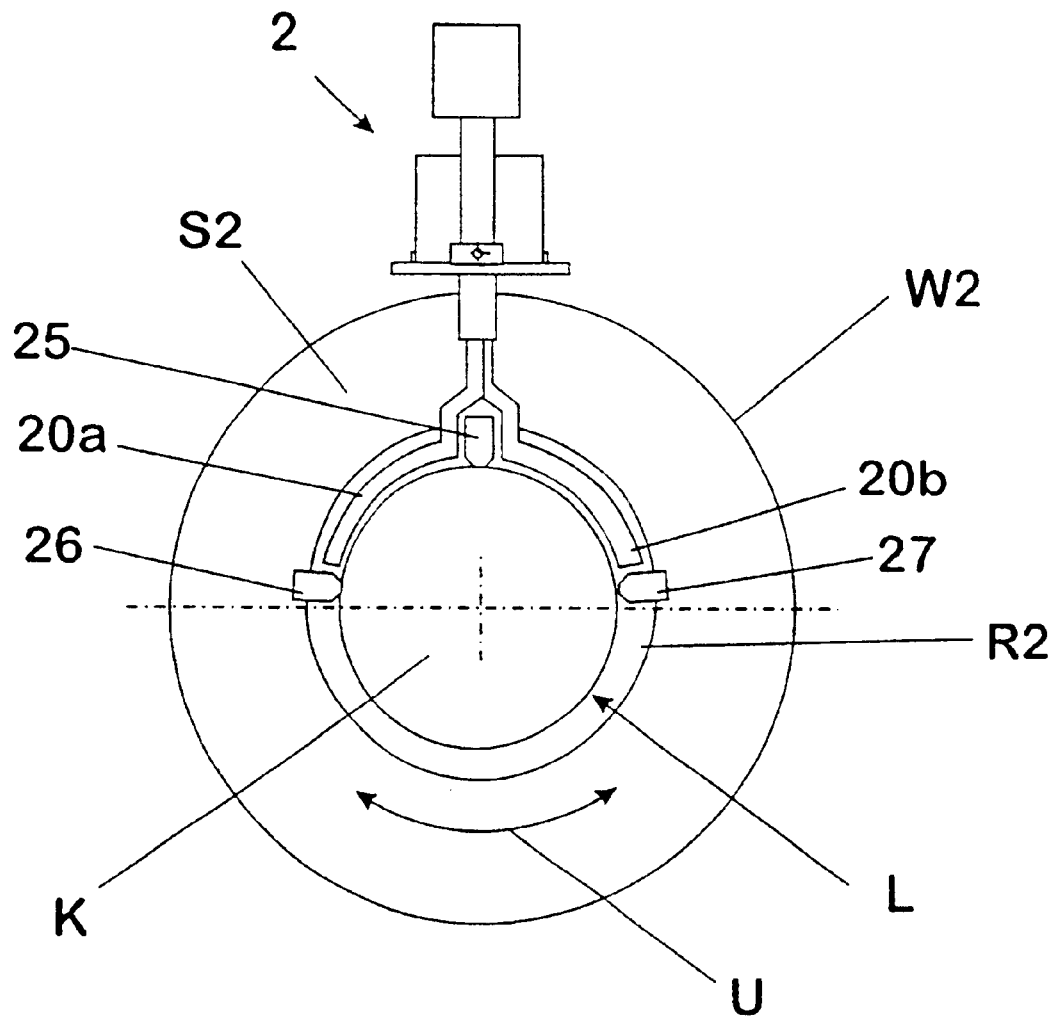

An embodiment of the invention will now be explained in greater detail with reference to the diagrammatic drawings, which show:

FIG. 1 a longitudinal section through two heating units used for the hardening of a bearing face of a crankshaft in a first operative position, FIG. 2 corresponds to FIG. 1 and shows the heating units in a second operative position, FIG. 3 corresponds to FIG. 1 and shows the heating units in a third operative position, FIG. 4 the bearing face with the heating conductors of two applied inductors in the second operating position of the heating units, FIG. 5 the bearing face with the heating conductors of applied inductors in the third operative position of the heating units, and FIG. 6 the bearing face sectioned a long the line I—I in FIG. 4.

Bearing face L of crankshaft K to be hardened can be, for example, that of a crankpin bounded laterally by cheeks W1, W2. The transitional radii R1, R2 in which the bearing face L merges into lateral surfaces S1, S2 of the cheeks W1, W2 take the form of annular grooves recessed into the cheeks W1, W2.

Heating units 1, 2 used for hardening the bearing face L each comprise an inductor 3, 4 and a power supply device 5, 6 via which the inductors 3, 4 are supplied with the necessary power. As well as this, the heating units 1, 2 are furnished with connections (not shown) for a coolant supply. As an alternative to their own power supplies 5, 6, the heating units 1, 2 can also be supplied with the necessary power via a common supply source. Similarly, a number of current/power supply devices can be provided to make the necessary power available.

The aforementioned parts of the heating units 1, 2 are each borne by a table 7, 8 each suspended from a suspension 9, 10. The suspension is pivotably connected in each case to a first adjusting device 11, 12 via which the heating units 1, 2 can be moved from the radial direction R on to the bearing face L to be hardened. The suspensions 9, 10 and the adjusting devices 11, 12 are so constructed that the heating units 1, 2 can follow the spatial movements of the bearing face L during a rotation of the crankshaft K. In addition, the power supply units 5, 6 and the inductors 3, 4 connected thereto are each borne on the particular table 7, 8 via a second adjusting device 13, 14 performing a movement A directed axis-parallel with the longitudinal axis X of the crankshaft K.

The inductors 3, 4 are disposed in the axial direction of the crankshaft K, the inductor 3 being associated with the transitional radius R1 and the inductor 4 with the transitional radius R2. The inductors 3, 4 have a first and second heating conductor branch 20, 22; 21, 23 respectively. The heating conductor branches 20–23 engage around the bearing face L by more than 140°, but less than 180°. The outer heating conductors 20; 21 of the inductors 3, 4 are associated with the particular transitional radius R1, R2, while the inner heating conductor branches 22, 23 are disposed adjacent one another.

The outer and inner heating conductor branches 20, 22; 21, 23 of the inductors 3, 4 are connected to one another via connecting branches 24, 26; 25, 27 of different lengths. In this way the adjacent inner heating conductor branches 22, 23 extend parallel with the one another and are directed at an angle, referred to the outer heating conductor branches 20, 21. They enclose an acute angle β with each longer branch 26, 27. This forms an overlap zone B inside which the heating branches 22, 23, viewed in the peripheral direction U of the bearing face L, overlap one another contact-free. The width of the overlap zone B measured in the axial direction of the crankshaft K is larger than the sum of the depths t1, t2 of the recessed transitional radii R1, R2. Each of the heating conductor branches 20–23 is divided into two component branches 20a, 20b. In this way a space is formed in the central zone of the inductors 3, 4. This space receives sliding pieces 25 each borne by the inductors 3, 4. Corresponding sliding pieces 26, 27 are positioned in the zone of the bottom ends of the heating conductor branches 20–23.

Prior to being lowered on to the bearing face L the inductors 3, 4 are moved jointly with their associated power supply devices 5, 6 into a closely adjacent position by means of the adjusting devices 13, 14 (FIG. 1). In this position the total width of the inductors 3, 4 is smaller than the width between the cheeks W1, W2 of the remaining free space. Then the heating units 1, 2 are lowered simultaneously by means of the adjusting devices 11, 12 from the radial direction R on to the bearing face L, until the inductors 3, 4 are located thereon (FIG. 2) In this position the inductors 3, 4 are borne and guided via the sliding pieces 25–27 on the bearing face L. Finally the inductors 3, 4 with the associated power supply devices 5, 6 are moved apart by means of the adjusting devices 13, 14 by a movement A directed axis-parallel with the longitudinal axis of the crankshaft K, until the outer heating conductors 20, 21 are located in their associated transitional radii R1, R2 (FIG. 3).

Then the hardening of the bearing face L and the transitional radii R1, R2 is performed in known manner. On completion of the hardening operation the inductors 3, 4 are lifted off the bearing face L in the converse sequence of steps, until the starting position is reached again.

What is claimed is:

1. An apparatus for the hardening of cylindrical bearing faces (L) of a shaft (K), wherein at least one of the transitional radii (R1, R2) to the adjoining shaft portions (W1, W2) is constructed recessed, having:

a pair of inductively operating heating units (1, 2), which are each formed at least by one inductor (3, 4) having two spaced-out heating conductor branches (20, 22; 21, 23) each extending in the peripheral direction (U) of the bearing face and which are connected to a power supply (5, 6), one outer heating conductor branch (20) of the inductor (4) of one heating unit (2) being associated with the first transitional radius (R1), and an outer heating conductor branch (22) of the inductor (3) of the other heating unit (1) being associated with the second transitional radius (R2), while in each case the inner heating conductor branches (22, 23) of the inductors (3, 4) are disposed adjacent one another;

an adjusting device (11, 12) for the purpose of adjusting the inductors (3, 4) simultaneously from the radial direction (R) on to the bearing face (L) to be hardened, until the inductors (3, 4) are applied to the bearing face (L), the heating conductor branches (20–23) engaging at least partially around the bearing face (L) in this state, and the inner heating conductor branches (22, 23) of the two inductors (3, 4), viewed in the peripheral direction (U), registering contactlessly with one another in an overlap zone (B), and a second adjusting device (13, 14) for the purpose of moving at least the inductor (3, 4) associated with the recessed radius (R1, R2) after application to the bearing face (L) by a movement directed axis-parallel with the longitudinal axis (X) of the shaft (K) in the direction of the recessed transitional radius (R1, R2), until its outer heating conductor branch (20) has moved into the particular transitional radius (R1, R2).

2. An apparatus according to claim 1, characterised in that each heating unit (1, 2) has a power supply (5, 6).

3. An apparatus according to claim 1, characterised in that measured in the axial direction of the shaft (K) the width of the overlap zone (B) is greater than the sum of the depths (t1, t2) of the transitional radii (R1, R2).

4. An apparatus according to claim 1, characterized in that in that the inductors (3, 4) engage around the bearing face (L) to be hardened by more than 90°.

5. An apparatus according to claim 4, characterised in that the inductors (3, 4) engage around the bearing face (L) by more than 140°.

6. An apparatus according to claim 1, characterized in that the inner heating conductor branches (22, 23) are disposed at an inclination in relation to the outer heating conductor branches (20, 21).

7. An apparatus according to claim 1, characterised in that the inner heating conductor branches (22, 23) are shorter than the outer heating conductor branches (20, 21) of the inductors (3, 4).

8. An apparatus according to claim 1, characterised in that the heating conductor branches (20–23) are each divided into two component parts (20a, 20b).

9. An apparatus according to claim 1, characterised in that the heating units (1, 2) bear at least one quenching spray.

10. An apparatus according to claim 1, characterised in that the purpose of the adjusting device (11, 12) operative in the radial direction (R) is to move the heating units (1, 2), including the inductors (3, 4), as one whole.

11. An apparatus according to claim 1, characterized in that the purpose of the adjusting device (13, 14) operative in the axial direction is to move the heating units (1, 2), including the inductors (3, 4), as one whole.

12. Use of an apparatus according to claim 1, hardening of the crankpins, bounded laterally by cheeks (W1, W2), of a crankshaft (K), wherein at least one of the transitional radii (R1, R2) is recessed into the cheeks (W1, W2).

* * * * *